(12) United States Patent
Ravasio et al.

(10) Patent No.: US 6,909,821 B2
(45) Date of Patent: Jun. 21, 2005

(54) NETWORK FOR DISTRIBUTING SIGNALS TO A PLURALITY OF USERS

(75) Inventors: Giuseppe Ravasio, Capriate San Gervasio (IT); Guido Oliveti, Turin (IT); Claudio Zammarchi, Milan (IT)

(73) Assignee: Pirelli Cavi e Sistemi S.p.A., Milan (IT)

( * ) Notice: Subject to any disclaimer, the term of this patent is extended or adjusted under 35 U.S.C. 154(b) by 178 days.

(21) Appl. No.: 10/169,167

(22) PCT Filed: Dec. 27, 2000

(86) PCT No.: PCT/EP00/13368

§ 371 (c)(1),
(2), (4) Date: Nov. 6, 2002

(87) PCT Pub. No.: WO01/50644

PCT Pub. Date: Jul. 12, 2001

(65) Prior Publication Data

US 2003/0123813 A1 Jul. 3, 2003

Related U.S. Application Data

(60) Provisional application No. 60/181,078, filed on Feb. 8, 2000.

(30) Foreign Application Priority Data

Dec. 31, 1999 (EP) .............................................. 99830829

(51) Int. Cl.⁷ .............................. G02B 6/28; H04J 14/00
(52) U.S. Cl. ......................... 385/24; 385/100; 385/101; 385/88; 385/89; 385/76; 385/77; 385/95; 385/90; 385/91; 385/93; 398/66; 398/70; 398/71; 398/82; 398/88; 398/142; 398/144
(58) Field of Search ............................. 385/47, 42, 31, 385/3, 34, 88, 89, 90–94, 96–99, 100, 101, 26, 76, 77, 33, 24; 398/66, 70, 71, 92, 88, 142, 144

(56) References Cited

U.S. PATENT DOCUMENTS

| | | | |
|---|---|---|---|
| 3,792,284 A | 2/1974 | Kaelin | 250/551 |
| 3,878,397 A | 4/1975 | Robb et al. | 250/551 |
| 4,595,839 A | 6/1986 | Braun et al. | 250/551 |
| 4,756,593 A | 7/1988 | Koakutsu et al. | 385/53 X |
| 4,767,168 A | 8/1988 | Grandy | 385/53 X |
| 5,140,451 A | 8/1992 | Talat et al. | 359/114 |
| 5,325,453 A | 6/1994 | Drissler | 385/75 |
| 5,325,455 A * | 6/1994 | Henson et al. | 385/89 |
| 5,329,607 A | 7/1994 | Kamikawa et al. | 385/123 |
| 5,911,019 A | 6/1999 | Cohen | 385/24 |
| 5,917,977 A * | 6/1999 | Barrett | 385/101 |
| 5,963,684 A | 10/1999 | Ford et al. | 385/24 |
| 6,103,398 A * | 8/2000 | Norton et al. | 428/620 |
| 6,204,915 B1 * | 3/2001 | Persegol et al. | 356/73.1 |
| 6,434,308 B1 * | 8/2002 | Trezza | 385/119 |
| 2002/0064347 A1 * | 5/2002 | Mertz et al. | 385/52 |
| 2003/0201462 A1 * | 10/2003 | Pommer et al. | 257/200 |

OTHER PUBLICATIONS

Sumida, M. et al., "Lens Coupling of Laser Diodes to Single–Mode Fibers", Journal of Lightwave Technology, vol. LT–2, No. 3, pp. 305–311, (Jun. 1984).

* cited by examiner

Primary Examiner—Brian M. Healy
(74) Attorney, Agent, or Firm—Finnegan, Henderson, Farabow, Garrett & Dunner, L.L.P.

(57) ABSTRACT

A network for distributing signals to a plurality of user apparatuses having a distribution unit with a plurality of ports, and a plurality of optical-fiber cables connected to the ports and suitable to make the plurality of ports of the distribution unit communicate with the plurality of user apparatuses. At least one of the plurality of optical-fiber cables is an electrically terminated optical cable having an optical cable with a single-mode optical fiber and an opto-electronic end portion mechanically and permanently connected to an end of the optical cable, and the opto-electronic end portion has an opto-electronic conversion device having an optic port optically aligned with and mechanically connected to, an end of the single-mode optical fiber.

15 Claims, 5 Drawing Sheets

NETWORK FOR DISTRIBUTING SIGNALS TO A PLURALITY OF USERS

CROSS REFERENCE TO RELATED APPLICATIONS

This application is a national phase application based on PCT/EP00/13368, filed Dec. 27, 2000, the contents of which are incorporated herein by reference, and claims the priority of European patent application No. 99830829.0, filed Dec. 31, 1999, and the benefit of U.S. Provisional Application No. 60/181,078, filed Feb. 8, 2000, the contents of which are incorporated herein by reference.

BACKGROUND OF THE INVENTION

1. Field of the Invention

The present invention relates to a network for distributing signals to a plurality of users, and to a method for installing said network into a building.

2. Description of the Related Art

Currently, in the telecommunication field optical technology is mainly used for long-distance transmission of optical signals using the known properties of wide band provided by optical fibres. On the contrary, the most used technology for distributing signals to a plurality of users (such as for example, analogue and/or digital television and/or telephone signals) and for transmitting digital data between electronic apparatuses (such as for example, the Personal Computers of a LAN network) makes use of electric cables such as, for example, coaxial cables or those made up of copper pairs.

Nevertheless, electric cables have a relatively narrow band, and they are becoming a bottleneck with respect to, the band of signals to be transmitted. Moreover, they present problems of electromagnetic interferences, of impedance matching, and they are difficult to be introduced into the appropriate raceways of a building since they are stiff. In addition, being bulky, they significantly reduce thee number of cables that can be inserted into a raceway. Moreover, due to electrical safety requirements, they require the arrangement of separate raceways from those used for distributing electric energy.

Thus, the research is investigating the possibility of using optics not just in the long-distance transmission of signals, but also in the signal distribution networks from a common branch point to a plurality of user apparatuses. In fact, optical-fibre cables are suitable to be inserted into the appropriate raceways of a building since they are not too bulky, they are flexible, light, free from electromagnetic interferences, and their bending loss is very low. Moreover, they are suitable for being inserted not too bulky, they are flexible, light, free from electromagnetic interferences, and their bending loss is very low. Moreover, they are suitable for being inserted into the same raceways used for distributing electric energy. Additionally, optical fibres potentially have a very wide band, low attenuation values, and they are transparent to the bit rate, to the format and to the code of transmission.

Moreover, among the various types of optical fibre, single-mode optical fibres are preferable since they are much less sensitive to bending losses, and they are less expensive, more rugged, with lower absorption losses; they are suitable to be used for a wavelength division multiplexing (or WDM) transmission, and they have a wider band, thus making a signal distribution network easily upgradable.

Nevertheless, for connections to electronic apparatuses, optical-fibre cables require the use of opto-electronic conversion devices to convert electric signals into corresponding optical signals, and vice versa.

The conversion of an electric signal into a corresponding optical signal is conventionally carried out by modulating the intensity of a light emitted by an optical source. The modulation is associated with the information carried by the electric signal, and the conversion of an optical signal into a corresponding electric signal is conventionally carried out by means of a photodetector.

The connection of an optical cable to an optical source and/or to a photodetector is conventionally carried out through an optical connector. Typically, an optical connector is a device comprising two parts that can be repeatedly connected to and disconnected from one another, and which must be attached to an end of the optical cable and to the optical source or to the photo-receiver respectively.

For example, an installation of an optical cable adapted to connect, inside a building, a user apparatus to a distribution unit (located, for example, in an office or in different spot size from the light emitted by the laser source [Masatoyo Sumida et al., "Lens coupling of laser diodes to single-mode fibers", JOURNAL OF LIGHTWAVE TECHNOLOGY, Vol. LT-2, No. 3, June 1984, pages 305–311].

Thus, although single-mode optical fibre cables present several advantages, their use on networks for distributing signals to a plurality-of users has been very limited-to-date.

U.S. Pat. No. 3,792,284 describes an electro-optical link for transmitting signals comprising an optical-fibre guide a light emitting diode (LED), and a photodiode. One end of the guide and the LED (or the photodiode) are mounted in fixed relationship with one another in a coupling unit having electrical connectors adapted to be inserted into a receptacle of an outer unit. The coupling between one end of the optical fibre and the LED (or photodiode) is carried out by placing them in front of one another.

U.S. Pat. No. 3,878,397 describes an electro-optical transmission line wherein an electric signal is converted to an optical output signal by a LED and the optical signal is transmitted by an optical fibre bundle to a diode which converts the optical signal back to an electrical signal. The optical fibres are made of plastic or quartz. The coupling between one end of the optical fibre bundle and the LED (or photodiode) is carried out by placing them in front of one another.

U.S. Pat. No. 4,595,839 describes an optical cable having two plastic or glass optical fibres and, at its two ends, two connectors. Each of the latter comprises a light source and a light detector respectively coupled to two ends of the optical fibres. The ends of the optical fibres are aligned with the respective light source or with the respective light detector through a ferrule housing the end of the fibre and an alignment guide which in turn houses the ferrule on one side, and the light source or the detector U.S. Pat. No. 5,911,019 discloses a network for distributing signals to a plurality of user apparatuses comprising a distribution unit having a plurality of ports and a plurality of fiber optic cables connected to said ports and suitable to make said plurality of ports communicate with said plurality of user apparatuses. At least one of said plurality of fiber optic cables is an electrically terminated optical cable which comprises an optical cable with an optical fibre and an opto-electronic end portion connected to an end of said optical cable. different spot size from the light emitted by the laser source [Masatoyo Sumida et al., "Lens coupling of laser diodes to single-mode fibers", JOURNAL OF LIGHTWAVE TECHNOLOGY, Vol. LT-2, No. 3, June 1984, pages 305–311].

Thus, although single-mode optical fibre cables present several advantages, their use on networks for distributing signals to a plurality of users has been very limited to-date.

U.S. Pat. No. 3,792,284 describes an electro-optical link for transmitting signals comprising an optical-fibre guide, a light emitting diode (LED), and a photodiode. One end of the guide and the LED (or the photodiode) are mounted in fixed relationship with one another in a coupling unit having electrical connectors adapted to be inserted into a receptacle of an outer unit. The coupling between one end of the optical fibre and the LED (or photodiode) is carried out by placing them in front of one another.

U.S. Pat. No. 3,878,397 describes an electro-optical transmission line wherein an electric signal is converted to an optical output signal by a LED and the optical signal is transmitted by an optical fibre bundle to a diode which converts the optical signal back to an electrical signal. The optical fibres are made of plastic or quartz. The coupling between one end of the optical fibre bundle and the LED (or photodiode) is carried out by placing them in front of one another.

U.S. Pat. No. 4,595,839 describes an optical cable having two plastic or glass optical fibres and, at its two ends, two connectors. Each of the latter comprises a light source and a light detector respectively coupled to two ends of the optical fibres. The ends of the optical fibres are aligned with the respective light source or with the respective light detector through a ferrule housing the end of the fibre and an alignment guide which in turn houses the ferrule on one side, and the light source or the detector on the opposed side.

U.S. Pat. No. 4,756,593 describes a connector comprising a plug and a socket. The plug is fastened to an end of an optical cable and comprises a LED for converting electric signals into optical signals and for sending them to the optical cable, and a photodiode for receiving the optical signals from the optical cable and converting them into electric signals.

U.S. Pat. No. 4,767,168 describes a hybrid cable having at least one optical fibre, a metal conductor, an input connector and an output connector. One of the two input and output connectors is provided with a light source for converting electric signals into optical signals, and the other one is provided with a photodetector for converting optical signals into electric signals.

U.S. Pat. No. 5,325,453 describes a signal transmission line comprising a polymeric optical wave guide and two connection elements connected to the two ends of the wave guide. In an embodiment, the transmission line is bi-directional; each connector comprises a light source, a photodiode (each having a portion of wave guide glued on their output) and a mixer. The light coming from the wave guide is sent by the mixer to the portion of wave guide glued to the output of the photodiode, whereas the light emitted by the light source on the portion of wave guide glued to it is sent by the mixer along the polymeric wave guide.

SUMMARY OF THE INVENTION

The Applicant faced the problem of manufacturing and installing, at low cost, in a simple and effective way, a network for distributing signals to a plurality of users by means of single-mode optical fibre cables.

The Applicant has found that said problem can be solved by means of an electrically terminated single-mode optical fibre cable, that is, having at least one end of the optical cable permanently connected to an opto-electronic end portion.

Thus, in a first aspect thereof, the present invention relates to a network for distributing signals to a plurality of user apparatuses, comprising:

a distribution unit having a plurality of ports, and a plurality of optical-fibre cables connected to said ports and suitable to make said plurality of ports of said distribution unit communicate with said plurality of user apparatuses, characterised in that at least one of said plurality of optical-fibre cables is an electrically terminated optical cable comprising an optical cable with a single-mode optical fibre and an opto-electronic end portion mechanically and permanently connected to an end of said optical cable, and said opto-electronic end portion comprises an opto-electronic conversion device having an optic port optically aligned with and mechanically connected to an end of said single-mode optical fibre.

In the present description and following claims, the expression "opto-electronic end portion or opto-electronic conversion device" respectively refers to an end portion or to a device carrying out an opto-electric and/or electro-optical conversion.

Typically, said signals to be distributed are digital.

Advantageously, said electrically terminated optical cable comprises a strength member.

Preferably, said strength member comprises a plurality of longitudinal yarns, flexible and with tensile strength, arranged between an outer sheath of the electrically terminated optical cable and said single-mode optical fibre.

More preferably, said longitudinal yarns are wound around and fastened to, the opto-electronic end portion.

Advantageously, said opto-electronic end portion also comprises an optical focusing lens having an elongated shape and a first endface optically aligned with and mechanically connected to the optical port of said opto-electronic conversion device.

Preferably, said opto-electronic end portion also comprises a ferrule firmly housing an end portion of said single-mode optical fibre so that said end of said optical fibre is lying flush with an endface of said ferrule.

More preferably, said opto-electronic end portion also comprises a sleeve tightly housing said ferrule and said optical lens with said endface of said ferrule and a second endface of said optical lens facing each other so as to optically align said optical lens with said optical fibre housed into said ferrule.

Advantageously, the opto-electronic conversion device, the optical lens and the optical fibre housed into the ferrule are arranged with respect to one another so as to allow a transfer of optical power between the opto-electronic conversion device and the optical fibre equal to at least 5%. Typically, equal to at least 10%. Preferably, to at least 50%.

In the embodiment of the distribution network of the invention wherein the opto-electronic end portion of the electrically terminated optical cable comprises an opto-electronic conversion device, a single-mode optical fibre, an optical lens, a ferrule and a sleeve, the alignment of the optical fibre with the optical port of the opto-electronic conversion device is accomplished by means of a suitable coupling of said elements. The alignment precision is obtained thanks to the fact that the optical lens is optically aligned with and connected to, the optical port of the opto-electronic conversion device; that an end portion of the optical fibre is firmly housed into the ferrule, and that the ferrule and the lens are housed into the sleeve so as to optically align the optical fibre with the optical lens.

In this embodiment, the optical alignment between the optical fibre and the optical port of the opto-electronic conversion device is thus obtained with a single step of precise optical alignment (that between the optical lens and the opto-electronic conversion device) and with simple steps of mechanical coupling (insertion of the end portion of the optical fibre into the ferrule and insertion of the ferrule and of the lens into the sleeve). Considering that when assembling the various parts of the electrically terminated optical cable, to reduce the times and costs required by the implementation of the step of precise optical alignment, said step can be carried out during the step of production of the opto-electronic conversion device in which, since a series of precision operations must be carried out for producing the conversion device, the presence of a suitable precision assembly bench is already provided; and that ferrules, optical lenses and sleeves with manufacture tolerance up to one micrometer are available on the market at a low price, this embodiment of the present invention advantageously allows obtaining a high precision of coupling between optical fibre and opto-electronic conversion device at relatively low costs.

Thus, this embodiment allows obtaining a distribution network with an optical cable made of a single-mode optical fibre, aligned with and permanently connected to, an opto-electronic conversion device with a high alignment precision and at a very low cost with respect to the prior art, wherein the optical cable is removably connected to an opto-electronic conversion device through a conventional optical connector.

According to an embodiment, at least one of said plurality of ports of said distribution unit is an optical port.

In this case, an end of said single-mode optical fibre, opposed to the end optically aligned with and mechanically connected to the optical port of the opto-electronic conversion device, is advantageously connected by means of fused junction with said optical port of said distribution unit, and said opto-electronic end portion has an electric port suitable to be connected to a corresponding user apparatus.

According to another type of embodiment, at least one of said plurality of ports of said distribution unit is an electric port.

In this case, said electrically terminated optical cable advantageously comprises also a second opto-electronic end portion permanently connected to an end of said optical cable, opposed to that permanently connected to the first opto-electronic end portion, said second opto-electronic end portion comprising an opto-electronic conversion device having an optical port optically aligned with and mechanically connected to, an opposed end of said single-mode optical fibre, and an electric port suitable to be coupled to said electric port of said distribution unit.

In this latest embodiment, the optical cable is electrically terminated at both ends.

The structural and functional characteristics of said second opto-electronic end portion are totally similar to those of the first opto-electronic end portion.

Advantageously, said optical lens has a substantially cylindrical shape. Preferably, it is a GRIN™ lens.

Advantageously, sand GRIN™ lens has such a pitch as to focus the light in output from the optical port of said opto-electronic conversion device to the input of said optical fibre housed into said ferrule, or vice versa, to focus the light in output from said optical fibre to the input of the optical port of said opto-electronic conversion device. For example, said GRIN™ lens has a pitch equal to 0.5 or to an integer multiple of 0.5.

Typically, said ferrule has a substantially cylindrical shape with a substantially central hole suitable to house the end portion of said optical fibre.

Advantageously, said optical fibre has a core and a cladding made of glass with an outer protective coating of a polymeric material. Preferably, the core of said optical fibre has a diameter smaller than or equal to, 20 $\mu$m. More preferably, said diameter is comprised between 3 and 15 $\mu$m. Even more preferably, it is comprised between 5 and 10 $\mu$m.

Typically, the diameter of the outer protective coating is equal to about 250 $\mu$m. In addition, the outer diameter of the cladding is typically of about 125 $\mu$m.

Typically, the end portion of said at least one optical fibre is stripped of the outer protective coating.

Preferably, the substantially central hole of said ferrule has a diameter substantially equal to the outer diameter of the end portion of the optical fibre. More preferably, the substantially central hole of said ferrule has a diameter substantially equal to the outer diameter of the end portion of the optical fibre, stripped of the outer protective coating.

Advantageously, the difference between the diameter of said substantially central hole of said ferrule and the diameter of the end portion of said optical fibre is smaller than or equal to, 1.5 $\mu$m. Preferably, said difference is less than or equal to, 1 $\mu$m. More preferably, it is less than or equal to, 0.5 $\mu$m.

Advantageously, between the axis of the substantially central hole and the axis of symmetry of the ferrule there is a deviation lower than or equal to, 1.5 $\mu$m. Preferably, said deviation is lower than or equal to, 1 $\mu$m. More preferably, it is lower than or equal to 0.5 $\mu$m.

Advantageously, the axes of symmetry of said optical lens and of said ferrule substantially coincide into said sleeve.

Advantageously, said ferrule and said optical lens have a substantially equal outer diameter.

Preferably, said sleeve has a substantially cylindrical hollow body with an inner diameter substantially equal to the outer diameter of the ferrule and of the optical lens. More preferably, said sleeve is made of an elastic material, with a diameter substantially smaller than the outer diameter of the ferrule and of the optical lens, and with a longitudinal slot extending throughout its length. In this way, said sleeve is adapted to enlarge so as to receive said ferrule and said optical lens, holding them into position once they have been inserted into it with an endface of the one towards the endface of the other one.

Typically, said sleeve is made of a metal material (for example, steel) or of zirconia.

Advantageously, said opto-electronic conversion device comprises a laser source. Typical examples of suitable laser sources are Fabry-Perot lasers, VCSEL (vertical cavity surface emitting laser) lasers, and single-frequency lasers such as, for example, DFB or DBR semiconductor lasers.

Advantageously, it is a single transversal mode laser source.

According to an alternative, said opto-electronic conversion device comprises a photodetector. Typically, said photodetector is a photodiode. Preferably, it is a PIN photodiode.

Typically, considering the expected use for the distribution of signals to final users starting from a common branch point, said optical cable is shorter than 2 km. Advantageously, it is arranged in a plurality of standard lengths such as, for example, 20, 50, 100, 500 and 1000 m.

Advantageously, said optical cable also comprises a plastic sheath suitable to contain said optical fibre.

Advantageously, the maximum transverse dimension of the opto-electronic end portion is greater than the diameter of the outer sheath of the optical cable by at most 4 mm. More preferably, by at most 3 mm. Even more preferably, by at most 1 mm.

Preferably, the opto-electronic end portion of the electrically terminated optical cable has a transverse dimension smaller than 7 mm. More preferably, smaller than 5 mm. Even more preferably, smaller than 4 mm.

Advantageously, the outer sheath of the optical cable has a diameter comprised between 2 and 7 mm. More preferably, said diameter is comprised between 2 and 5 mm.

This advantageously allows facilitating the passage of the opto-electronic end portion of the electrically terminated optical cable of the invention along the raceway of a building.

Typically, said optical cable also comprises an additional optical fibre. Advantageously, in this case, said opto-electronic end portion of said electrically terminated optical cable also comprises:

an additional opto-electronic conversion device having an electric port and an optical port;

an additional ferrule firmly housing an end portion of said additional optical fibre so that said additional optical fibre has one end lying flush and perfectly aligned with an endface of said additional ferrule;

an additional optical focusing lens having an elongated shape and a first endface optically aligned with, and mechanically connected to, the optical port of said additional opto-electronic conversion device; and a sleeve tightly housing said additional ferrule and said additional optical lens with said endface of said additional ferrule and a second endface of said additional optical lens facing each other so as to optically align said additional optical lens with said additional optical fibre housed into said additional ferrule.

As regards the structural and functional characteristics of said additional optical fibre, said additional opto-electronic conversion device, said additional optical lens, said additional ferrule and said additional sleeve, reference shall be made to what previously described.

In a second aspect thereof, the present invention further relates to a method for installing a network for distributing signals to a plurality of electric user apparatuses in a building, said network comprising a distribution unit having a plurality of optical ports and a plurality of electrically terminated optical cables, each comprising an optical cable with a single-mode optical fibre and an opto-electronic end portion mechanically and permanently connected to an end of said optical cable, said method comprising, for each electrically terminated optical cable, the following steps:

a) inserting, from the side of the corresponding user apparatus, an optical end of the optical cable, opposed to that mechanically connected to the opto-electronic end portion, into a raceway of the building connecting the distribution unit to the user apparatus;

b) making the optical cable pass along said raceway, pulling it by the optical end of said optical cable inserted into the raceway during step a), until it arrives in the proximity of a corresponding optical port of the distribution unit;

c) optically connecting the optical end of the optical cable to the optical port of the distribution unit; and d) electrically connecting said opto-electronic end portion to the user apparatus.

Advantageously, step c) is carried out through a fused junction of an end of the single-mode optical fibre, arranged in correspondence with the optical end of the optical cable, with the optical port of the distribution unit.

In a third aspect thereof, the present invention further relates to a method for installing a network for distributing signals to a plurality of electric user apparatuses in a building, said network comprising a distribution unit having a plurality of electric ports and a plurality of electrically terminated optical cables, teach comprising an optical cable with a single-mode optical fibre and two opto-electronic end portions mechanically and permanently connected to two opposed ends of said optical cable, said method comprising, for each electrically terminated optical cable, the following steps:

a) inserting an opto-electronic end portion into a raceway of the building connecting the distribution unit and the user apparatus;

b) making the optical cable pass along said raceway, pulling it by the opto-electronic end portion inserted into the raceway during step a);

c) electrically connecting one of the two opto-electronic end portions to the electric port of the distribution unit; and d) electrically connecting the other end portion Of the user apparatus.

Advantageously, the optical cable has an outer sheath with a diameter comprised between 2 and 7 mm. More preferably, said diameter is comprised between 2 and 5 mm.

Advantageously, the maximum transverse dimension of at least one of the two opto-electronic end portions is greater than the diameter of the outer sheath of the optical cable by at most 4 mm. More preferably, by at most 3 mm. Even more preferably, by at most 1 mm.

Preferably, at least one of the two opto-electronic end portions of the electrically terminated optical cable has a transverse dimension smaller than 7 mm. More preferably, smaller than 5 mm. Even more preferably, smaller than 4 mm.

This advantageously allows facilitating the passage of at least one of the two end portions of the electrically terminated optical cable along a raceway of the building.

BRIEF DESCRIPTION OF THE DRAWINGS

Further features and advantages of the present invention will appear more clearly from the following detailed description of a preferred embodiment, made with reference to the attached drawings. In such drawings.

DETAILED DESCRIPTION OF THE INVENTION

Figure 1:
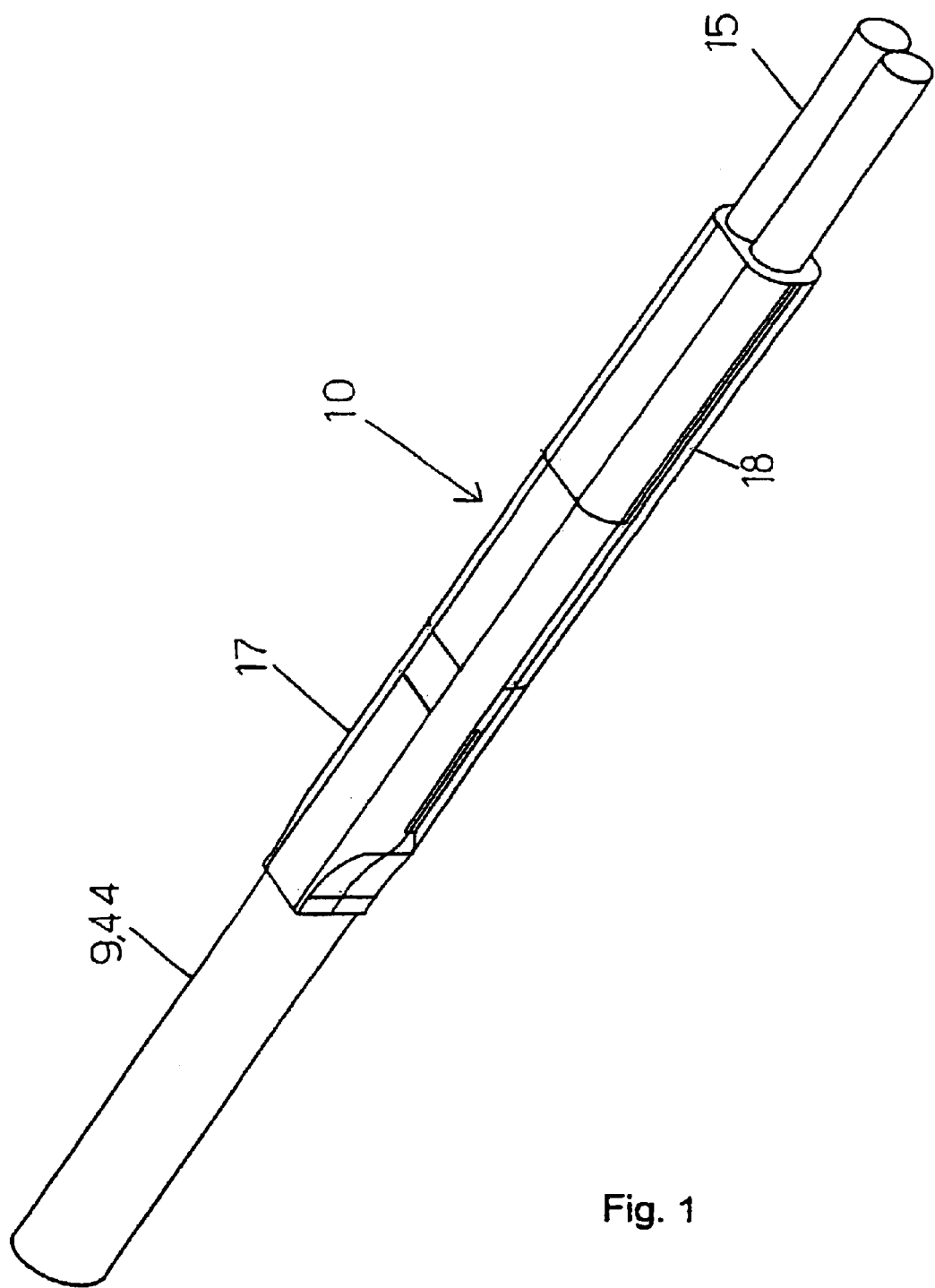
FIG. 1 shows a portion of an electrically terminated optical cable of the signal distribution network of the invention.

FIG. 1 shows an embodiment of an electrically terminated optical cable 1 that can be used on a distribution network 100 of the invention. It comprises an optical cable 9 having two ends and an opto-electronic end portion 10 permanently connected to one of the two ends.

In the embodiment shown, the optical cable 9 comprises two single-mode optical fibres (not shown), a plastic coating to cover both fibres, and an outer plastic sheath.

Each optical fibre is of the SMR model produced by the manufacturing firm FIBRE OTTICHE SUD F.O.S. S.p.A., has a core, a cladding with an outer diameter equal to 125 $\mu$m, and an outer acrylate coating with outer diameter of 250 $\mu$m. In addition, each fibre has a nominal attenuation equal to 0.2 dB/Km.

Moreover, the optical cable 9 comprises a plurality of longitudinal yarns made of Kevlar™ (not shown) that are flexible and tensile resistant.

Said Kevlar™ yarns are arranged between the plastic coating of the two optical fibres and the outer plastic sheath.

For example, the optical cable 9 is of the type described in the Patent Application EP 0 829 742 filed by the Applicant of the present invention.

Figure 2:
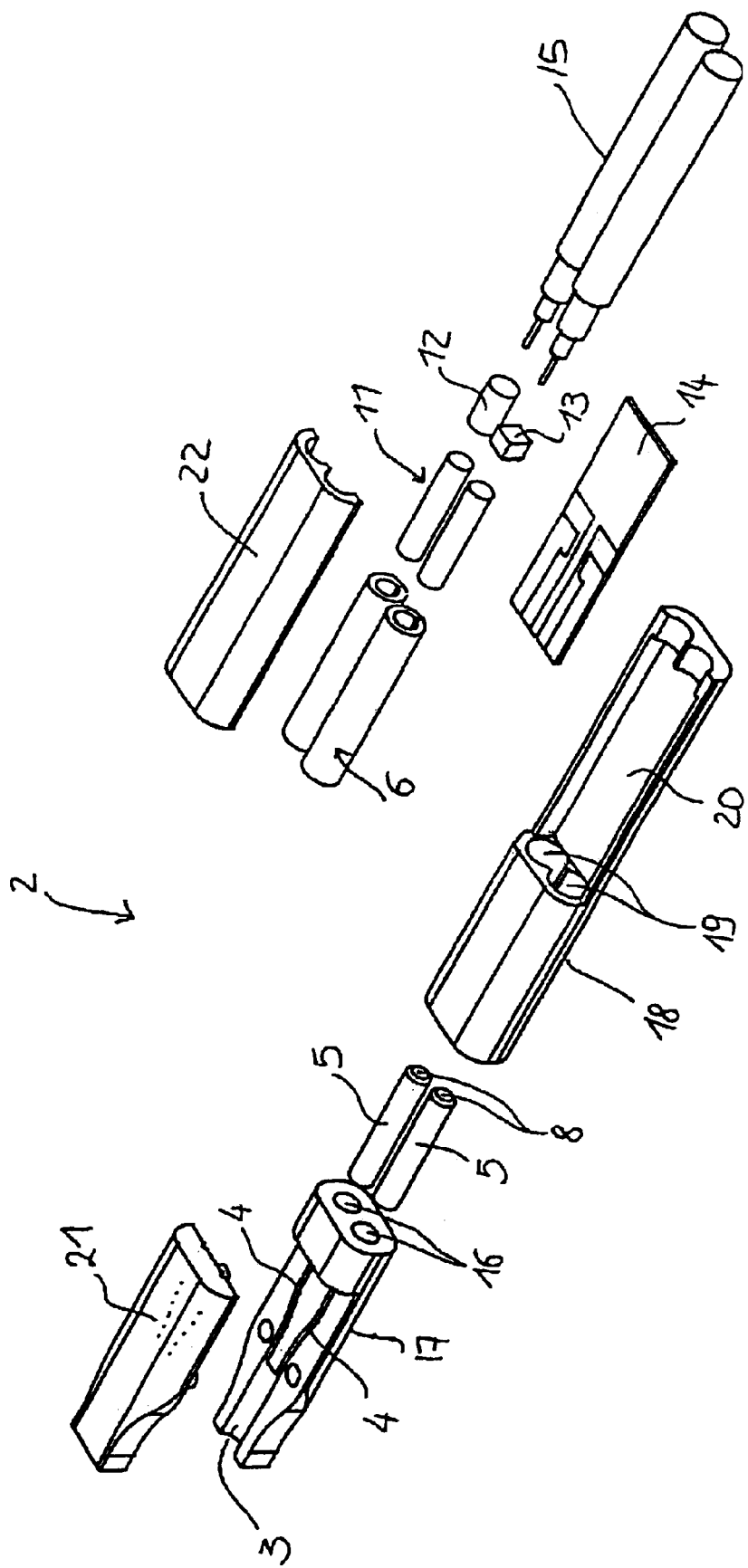
FIG. 2 shows elements comprised into an opto-electronic end portion of the cable of FIG. 1.

The opto-electronic end portion 10 comprises a container 2 of which a first portion 17 is suitable to house one of the two ends of the optical cable 9, two end portions of the two optical fibres and two ends of two ferrules 5, whereas a second portion 18 is suitable to house the two ferrules 5, two optical lenses 11, two sleeves 6, a first and a second opto-electronic conversion device 12 and 13, an electronic card 14 and two electric cables 15 (FIG. 2).

Advantageously, said container 2 is made of plastic, and it is suitable to house the above components in a reciprocally fixed position. Moreover, in the embodiment shown, it has a substantially parallelepiped shape, a length of about 40 mm, a height of about 3 mm and a width of about 5 mm.

The first portion 17 of said container 2 is provided with a groove 3 for housing an end of the optical cable, two grooves 4 for housing the ends of the two optical fibres exiting from the optical cable 9, and two holes 16 for housing two ends of the ferrules S.

In addition, the second portion 18 of said container 2 is provided with two longitudinal holes 19 suitable to house the two sleeves 6, and with a support base 20 for housing the electronic card 14, the two opto-electronic conversion devices 12 and 13 and the two electric cables 15.

The two ferrules 5 have a cylindrical shape with a substantially central hole 8 suitable to house two end portions of the two optical fibres.

For example, said ferrules 5 are produced and marketed by the firm HIROSE, JP, and their manufacture tolerance is in the range of 1 $\mu$m.

The two optical lenses 11 are conventional GRIN™ lenses with a cylindrical shape.

For example, said optical lenses 11 are produced and marketed by the firm NSG America, and their manufacture tolerance is in the range of 1 $\mu$m.

In the embodiment shown, both ferrules 5 and the optical lenses 11 have an outer diameter of about 1.249 mm, and a length of about 5 mm.

The two sleeves 6 are made of metal, and have a cylindrical shape. Moreover, each sleeve has an inner diameter slightly smaller than the outer diameter of ferrules 5 and of the optical lenses 11 so as to tightly house them inside it. In the example shown, the sleeve has an inner diameter of about 1.2 mm. A longitudinal groove allows sleeves 6 to enlarge so as to receive ferrules 5 and the optical lenses 11 inside them.

Additionally, in each sleeve 6, the ferrule 5 has an endface in contact with an endface of the optical lens 11.

According to a variant, in each sleeve 6, the ferrule 5 and the optical lens 11 are interspaced by means of a transparent element (for example, of glass) or of a mechanical abutment surface arranged inside the sleeve 6.

In both cases, the GRIN™ optical lens 11 optically aligned with and fastened to, the optical port of the laser source 12 has a selected pitch so as to focus the light exiting from said optical port onto the end of the corresponding optical fibre.

Moreover, the GRIN™ optical lens 11 optically aligned with and fastened to, the optical port of photo-receiver 13 has a selected pitch so as to focus the light exiting from said optical fibre onto the optical port of photo-receiver 13.

Both the first and the second opto-electronic conversion device 12 and 13 have an optical port and an electric port (not shown).

In the embodiment shown, the first opto-electronic conversion device 12 is a laser source of the VCSEL type, with emission at wavelength of about 1300 nm, and a diameter of about 1.5 mm and length of about 3 mm.

Advantageously, the laser source 12 is housed into a PILL package, and the optical lens is glued directly onto the package.

In turn, the second opto-electronic conversion device 13 is a PIN photodiode produced by the manufacturing firm EPITAXY with a reception band of about 1 GHz, and an active area of about 100 $\mu$m.

The electronic card 14 is a conventional device the characteristics of which will be obvious to the man skilled in the art on the basis of the present description and without departing from the scope of the invention.

The electric cables 15 are, for example, conventional coaxial cables. Typically, they are less than 2 m long. Preferably, their length is comprised between 0.5 and 1 m.

Alternatively, when the transmission band is lower than about 10 Mbit/s, the electric cables 15 can be copper pairs.

When assembling the various elements of the end portion 10 of the electrically terminated optical cable 1, each optical lens 11 is optically aligned with and fastened to, the optical port of the respective opto-electronic conversion device 12, 13.

The optical alignment, for example, can be conventionally carried out in an active way, that is, said alignment is carried out by measuring the optical power transmitted by the optical port of the opto-electronic conversion device 12, 13 to the optical lens 11 or, vice versa, by the optical lens 11 to the optical port of the opto-electronic conversion device 12, 13, and reciprocally arranging said optical lens 11 and said optical port so as to obtain a suitable transfer of optical power from the one to the other.

In addition, the fastening of the optical lens 11 to the optical port of the respective opto-electronic conversion device 12, 13 can be carried out through gluing.

Sleeves 6 are inserted into the longitudinal holes 19 of the second portion 18 of container 2.

On the side of the optical cable 9, said holes 19 have apertures with such dimensions as to prevent the passage of sleeves 6. Thus, the latter are introduced into holes 19 through apertures located on the opposed side with respect to cable 9 and once inserted into said holes 19, they are locked inside them by the apertures of the holes 19 located on the side of the optical cable 9, on the one side, and by the electronic card 14, which is afterwards laid onto the support base 20, on the opposed side.

In addition, the end portions of the optical fibres exiting from the optical cable 9 are stripped of their outer acrylate coating, are made pass through the two holes 16 of the first portion 17 of container 2; they are coated with a glue and inserted into the substantially central hole 8 of ferrules 5, where they are shortly let slide backwards and forwards so as to evenly distribute the glue inside hole 8. Once the end portions of optical fibre have been glued inside hole 8, they are cut flush with the end faces of ferrules 5 located at the opposed side of the optical cable 9; afterwards said faces are polished through lapping.

Then, the ferrules 5 and the optical lenses 11 are inserted into the second portion 18 of container 2, inside sleeves 6, with the endfaces of ferrules 5, with which the ends of the optical fibres lie flush, in contact with the endfaces of the respective optical lenses 11.

The second portion 18 of container 2 is suitable to loosely house sleeves 6 so as to allow them to slightly enlarge during the introduction of ferrules 5 and of the optical lenses 11.

Then, the ends of ferrules 5 located on the side of the optical cable 9 are glued into holes 16; the two optical fibres exiting from the optical cable 9 are arranged into the respective grooves 4, and an end portion 44 of the outer plastic coating, with the two optical fibres housed into it, is inserted into groove 3.

After having inserted sleeves 6 and the optical lenses 11, with the respective opto-electronic conversion device 12, 13, fastened to them, into container 2, the electronic card 14 is arranged onto the support base 20; the electrical connections between the opto-electronic conversion devices 12 and 13, the electronic card 14 and the electric cables 15 are set and, finally, the first and the second portion 17 and 18 of container 2 are sealed with two respective covers 21 and 22, and they are fastened to one another so as to obtain the end portion 10 shown in FIG. 1.

Finally, the plurality of Kevlar™ yarns exiting from the optical cable 9 is wound around and fastened to the end portion 10 so as to impart tensile strength to it.

Optionally, the Kevlar™ fibres continue beyond the end portion 10 and are wound also around the electric cables 15.

Moreover, the end of the optical cable 9, the end portion 10 and, in case, the electric cables 15, enveloped in the plurality of Kevlar™ yarns, are covered with a sheath made of a thermally-shrinkable material. The latter is then heated so as to make the sheath adhere to the end of the optical cable 9, to the end portion 10, and in case, to the electric cables 15 so as to make them suitably impermeable to external agents.

According to an alternative, the optical cable 9 comprises one or more electric conductors, for example, suitable to transport a supply current.

Nevertheless, the variant of the optical cable 9 without electric conductors is preferred since it has the advantage that it can be inserted into the same raceways used for distributing electric energy without any problems of electric safety.

As already said, the GRIN™ optical lens 11, optically aligned with and fastened to, the optical port of the laser source 12 has a selected pitch so as to focus the light exiting from said optical port onto the end of the corresponding optical fibre. Moreover, the GRIN™ optical lens 11 optically aligned with and fastened to, the optical port of photo-receiver 13 has a selected pitch so as to focus the light exiting from the corresponding optical fibre onto the optical port of photo-receiver 13.

The opto-electronic end portion 10 of the electrically terminated optical cable 1 thus guarantees a high precision of optical coupling between the opto-electronic conversion devices 12, 13 and the corresponding optical fibres.

Although in the embodiment shown the bi-directional optical cable 9 comprises two optical fibres respectively connected to the laser source 12 and to photo-receiver 13, according to a variant (not shown) the optical cable 9 can comprise a singe optical fibre connected, by means of a conventional optical coupler or an optical circulator, both to the laser source 12 and to photo-receiver 13. According to another variant, the optical signals travelling into the two directions have two different wavelengths and the couplers are advantageously wavelength selective, such as for example, conventional wavelength multiplexing/demultiplexing devices.

In the embodiment shown, the electrically terminated optical cable 1 has a single opto-electronic end portion 10. That is to say, the optical cable 9 is permanently electrically terminated only at one end.

According to an alternative embodiment of the invention, besides the first end portion 10 permanently connected to an end of the optical cable 9, the electrically terminated optical cable 1 has a further opto-electronic end portion (not shown) which is permanently connected to the opposed end of said optical cable 9.

As regards the structural and functional characteristics of said further opto-electronic end portion, reference shall be made to what described above relating to the first end portion 10.

For example, in the case that the optical cable is electrically terminated at the two ends; the laser source 12 of an end portion 10 emits optical power equal to 1 mW; the coupled power in optical fibre is equal to −10 dBm (equal to 10% of the power emitted by the laser source) and the receiver comprising the photodiode 13, in the opposed end portion 10, has a sensitivity equal to −30 dm, the electrically terminated optical cable of the invention has a power budget equal to 20 dB. In other words, power losses up to a maximum of 20 dB are allowed along the electrically terminated optical cable.

The electrically terminated optical cable 1 of FIG. 1 can be used for a bi-directional transmission of optical signals between an optical apparatus and an electric apparatus.

For example, it can be used for connecting an optical distribution unit and an electric user apparatus in a signal distribution system to a plurality of users. In this case, the electric cables 15 of the opto-electronic end portion 10 of the electrically terminated cable 1 can be directly connected to the electric connections of the user apparatus.

In addition, the electrically terminated optical cable 1 can be made pass along the raceway of a building, which connects the electric user apparatus to the distribution unit, from the optical end that is not connected to the opto-electronic end portion 10 since the dimensions of said optical end are typically smaller than those of said opto-electronic end portion 10.

On the contrary, when the two ends of the optical cable 9 are permanently connected to two opto-electronic end portions 10, the electrically terminated optical cable 1 can be directly connected to an electric user apparatus and to an electric distribution unit without the requirement of using any optical connector for the connection to the opto-electronic conversion devices.

In this last case, the electrically terminated optical cable 1 must be made pass along the appropriate raceway through one of the two opto-electronic end portions 10. This is not an obstacle because, as described above, said end portions of the electrically terminated optical cable of the invention can be miniaturized. In particular, they can have transverse dimensions in the range of some millimeters.

Figure 3:
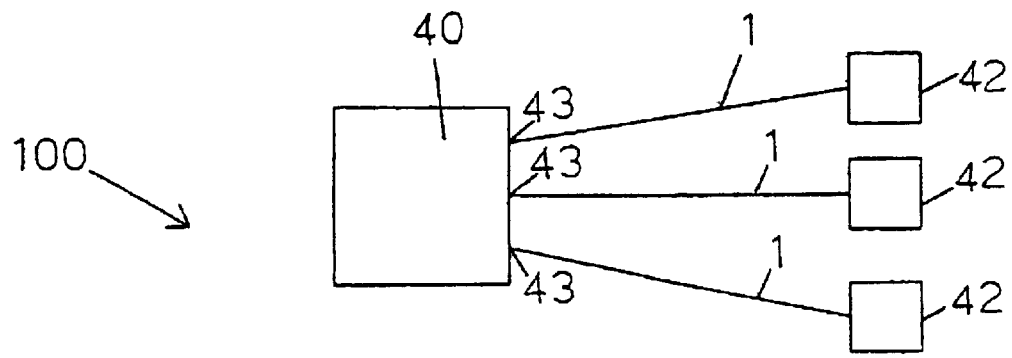
FIG. 3 shows a schematic view of a signal distribution network of the invention.

FIG. 3 shows an embodiment of a network 100 for distributing signals to a plurality of electric user apparatuses 42, comprising a distribution unit 40 with three input/output ports 43 and three electrically terminated optical cables 1. The three cables 1 make the three input/output ports 43 of the distribution unit 40 communicate with three electric user apparatuses 42.

Figure 4:
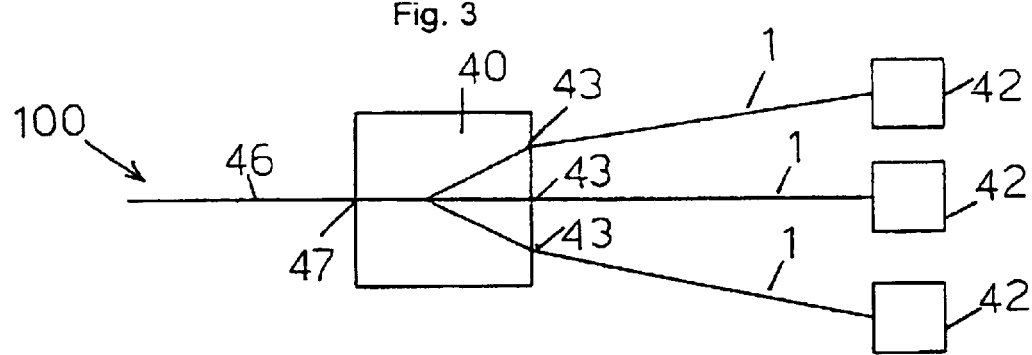
FIG. 4 shows a schematic view of a first embodiment of a signal distribution network of the invention.

In the embodiment of FIG. 4, the distribution network 100 is suitable to send optical signals coming from an optical fibre line 46 to the user apparatuses 42.

In this embodiment, the distribution unit 40 is an optical apparatus comprising abeam splitter suitable to route the digital optical signals coming from the optical fibre line 46 on three input/output optical ports 43.

In this embodiment, the three electrically terminated optical cables 1 have a single opto-electronic end portion 10, and the electric cables 15 of said end portion 10 are suitable to be connected directly to the user apparatuses 42.

The optical end of electrically terminated optical cables 1 is preferably fastened to the optical ports 43 of said distribution unit 40 through a fused junction.

According to a variant, the optical end of electrically terminated optical cables 1 is mechanically connected to the optical ports 43 of said distribution unit 40 by means of conventional optical connectors.

According to a variant, electrically terminated optical cables 1 are advantageously bi-directional so as to allow a propagation of signals from user apparatuses 42 to the distribution unit 40 and from the distribution unit 40 to the user apparatuses 42.

In the case of bi-directional cables, the end portion 10 of electrically terminated optical cables 1 has both a laser source 12 for sending optical signals from the user apparatus 42 to the distribution unit 40, and a photodetector 13 for receiving optical signals from the distribution unit 40 and converting them into corresponding electric signals so as to supply them to the user apparatus 42.

In addition, each optical cable 9 has two single-mode optical fibres for transmitting the optical signals in the two directions, respectively connected to the laser source 12 and to the photo-receiver 13.

According to a variant, each optical cable 9 has only one single-mode optical fibre for transmitting optical signals in the two directions that are connected by means of a conventional coupler or an optical circulator both to the laser source 12 and to the photo-receiver 13. According to another variant, the optical signals travelling in the two directions have two different wavelengths, and the couplers advantageously are wavelength selective such as, for example, conventional wavelength multiplexing/demultiplexing devices.

Figure 5:
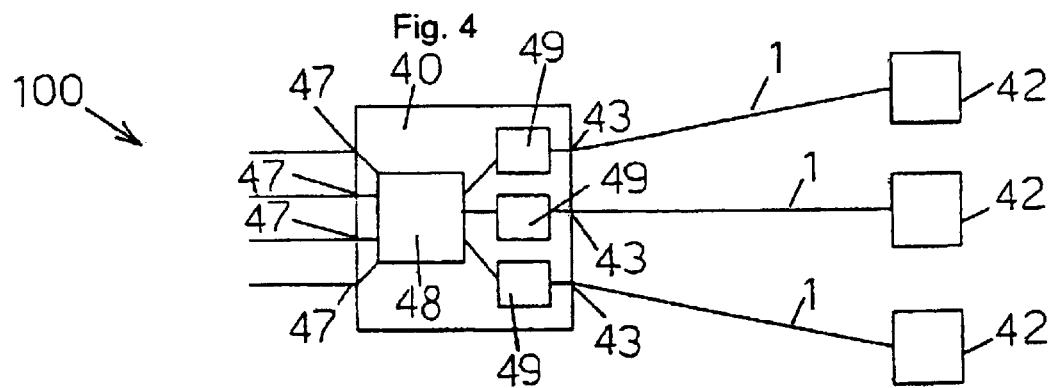
FIG. 5 shows a schematic view of a second embodiment of a signal distribution network of the invention.

In the embodiment of FIG. 5, the distribution network 100 is similar to that of FIG. 4 with the exception that the distribution unit 40 is suitable to comprise an opto-electronic apparatus.

More in particular, the distribution network 100 is suitable to receive a plurality of input electric signals (preferably, digital) from a plurality of electric input/output ports 47; to send them to an electric processing unit 48 which processes them, according to the applications; to provide a plurality of output electric signals; to convert them into corresponding optical signals by means of opto-electronic converters 49; to provide them to the input/output optical ports 43 and to send them, through transmission on the electrically terminated optical cables 1, to the user apparatuses 42.

Moreover, the distribution unit 40 is also advantageously suitable to receive from the optical ports 43 the optical signals coming, through transmission on the electrically terminated optical cables 1, from the user apparatuses 42; to convert them into corresponding electric signals through the opto-electronic converters 49; to send them to the electric processing unit 48 which processes them according to the applications, and to provide a plurality of output electric signals to the input/output ports 47.

The electric processing unit 48, for example, is suitable to demodulate the electric digital signals coming from the electric input ports 47, to amplify them and, in case, to modulate them according to a conventional modulation format and/or to select the signal/s to be sent on each electrically terminated electric cable 1. In addition, for example, it is suitable to demodulate the electric digital signals coming from the opto-electronic converters 49, to amplify them and, in case, to modulate them according to a conventional modulation format and/or to select the signal/s to be sent on each input/output port 47.

Typically, electro-optical converters 49 comprise laser sources that emit a light which is modulated in amplitude by amplitude modulators according to the information carried by the electric signals exiting from said processing unit 48.

In addition, such converters advantageously comprise conventional photodetectors suitable to receive the signals coming from the optical ports 43; to convert them into corresponding electric signals and to transmit them to the processing unit 48.

Figure 6:
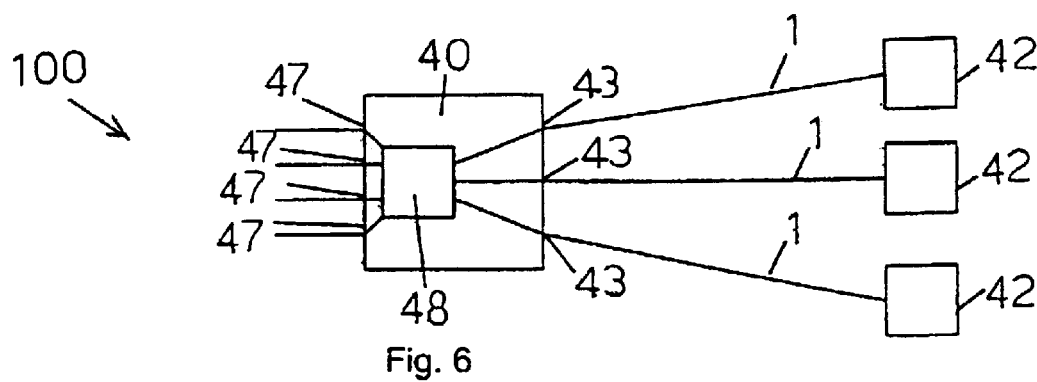
FIG. 6 shows a schematic view of a third embodiment off a signal distribution network of the invention.

In the embodiment of FIG. 6, the distribution network 100 is similar to that of FIG. 5 with the exception that the distribution unit 40 is suitable to comprise an electric apparatus and the input/output ports 43 are electric ports instead of optical ports.

More in particular, the distribution unit 40 is suitable to receive a plurality of input electric signals from a plurality of electric input/output ports 47; to send them to an electric processing unit 48 which processes them, according to the applications; to provide a plurality of electric signals to the input/output electric ports 43 and to send them through transmission on the electrically terminated optical cables 1, to the user apparatuses 42.

Moreover, the distribution unit 40 is also advantageously suitable to receive from the electric ports 43 the electric signals coming, through transmission on the electrically terminated optical cables 1, from the user apparatuses 42; to send them to the electric processing unit 48 which processes them according to the applications, and to provide a plurality of output digital electric signals to the input/output ports 47.

In addition, in this last embodiment, the electrically terminated optical cables 1 have, at the two ends, two opto-electronic end portions 10, and the electric cables 15 of said end portions 10 are suitable to be connected directly to the user apparatuses 42, at one end of cables 1, and to the electric ports 43 of the distribution unit 40, at the opposed end of said cables.

Figure 7:
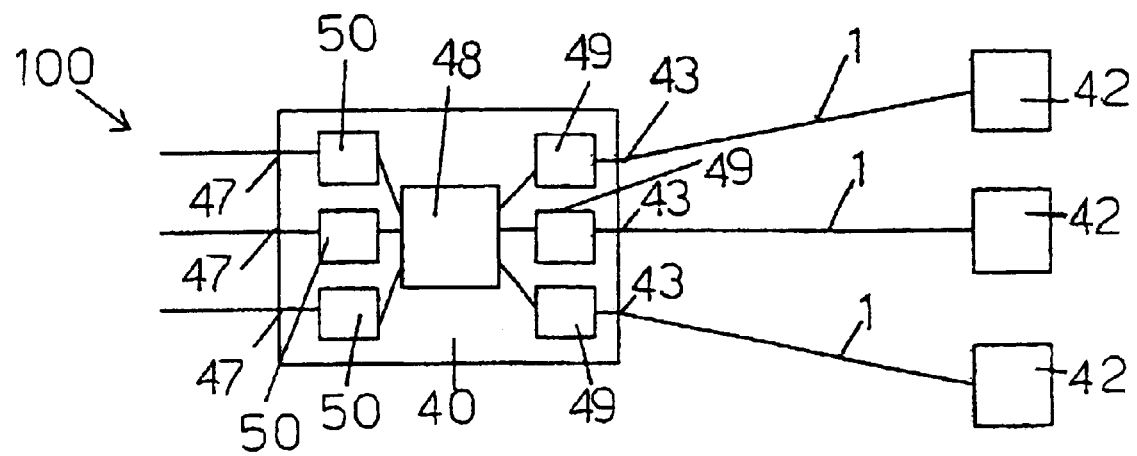
FIG. 7 shows a schematic view of a fourth embodiment of a signal distribution network of the invention.

In the embodiment of FIG. 7, the distribution network 100 is similar to that of FIG. 5 with the exception that the distribution unit 40 also comprises opto-electronic converters 50, and the input/output ports 47 are optical ports instead of electric ports.

More in particular, the distribution unit 40 is suitable to receive a plurality of input digital optical signals from the plurality of optical input/output ports 47; to convert said optical signals into corresponding electric signals through the opto-electronic converters 50; to send them to the electric processing unit 48 which processes them, according to the applications; to provide a plurality of output digital electric signals; to convert the latter into corresponding digital optical signals through opto-electronic converters 49; to provide them to the input/output optical ports 43 and to send them, through transmission on electrically terminated optical cables 1, to the user apparatuses 42.

Moreover, the distribution unit 40 is also advantageously suitable to receive from the optical ports 43 the optical signals coming, through transmission on the electrically terminated optical cables 1, from the user apparatuses 42; to convert them into corresponding electric signals through opto-electronic converters 49; to send them to the electric processing unit 48 which processes them; to provide a plurality of digital electric signals to the opto-electronic converters 50, which convert them into corresponding optical signals, and to transmit said optical signals to the input/output optical ports 47.

For example, in the variant (shown in FIG. 8) of this embodiment, the distribution unit 40 is a distribution network of digital signals to a plurality of users, for example, according to a 100 Mbit/s Fastethernet™ protocol. Said signals arrive in optical form to an optical port 47 from an input optical fibre 51. Then, they are converted into corresponding electric signals by an opto-electronic converter 50. Moreover, the processing unit 48 is suitable to select, among the electric signals, the digital signal intended for each user (for example, according to a 10 Mbit/s Ethernet™ protocol) and to send it to a corresponding opto-electronic converter 49. Said converter converts the digital electric signal intended for the user into a corresponding optical signal and send it to the corresponding user apparatus through the respective electrically terminated optical cable 1.

Figure 8:
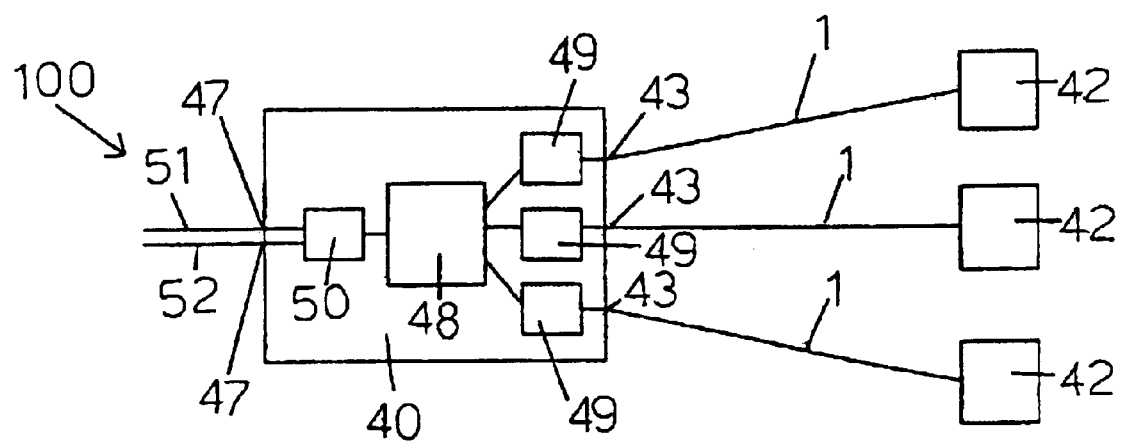
FIG. 8 shows a schematic view of a variant of the fourth embodiment of FIG. 7.

In addition, in this variant of FIG. 8, each user apparatus 42 is suitable to send a digital signal to the distribution unit 40. Each digital signal coming from cables 1 to one of the optical ports 43 is converted into a corresponding electric signal by the respective opto-electronic converter 49, and sent to the processing unit 48, which processes it according to the applications. The latter, among the other things, time-multiplexes the above signals coming from the various user apparatuses 42, and provides a single time multiplexed electric signal to the opto-electronic converter 50. Said converter 50 converts said multiplexed electric signal into a corresponding optical signal, and sends it to an optical port 47 connected to an output optical fibre 52.

For example, the processing unit 48 is a ROUTER CATA-LYST 2900 XL produced by CISCO SYSTEMS.

In general, the signal distribution network 100 of the invention can be used for distributing a plurality of television and/or telephone and/or Internet digital signals coming from a long-distance transmission via satellite and/or via coaxial cable and/or via optical fibre and/or through the air to a plurality of electronic user apparatuses 42.

Moreover, it can be used, for example, in LAN distribution networks.

Figure 9:
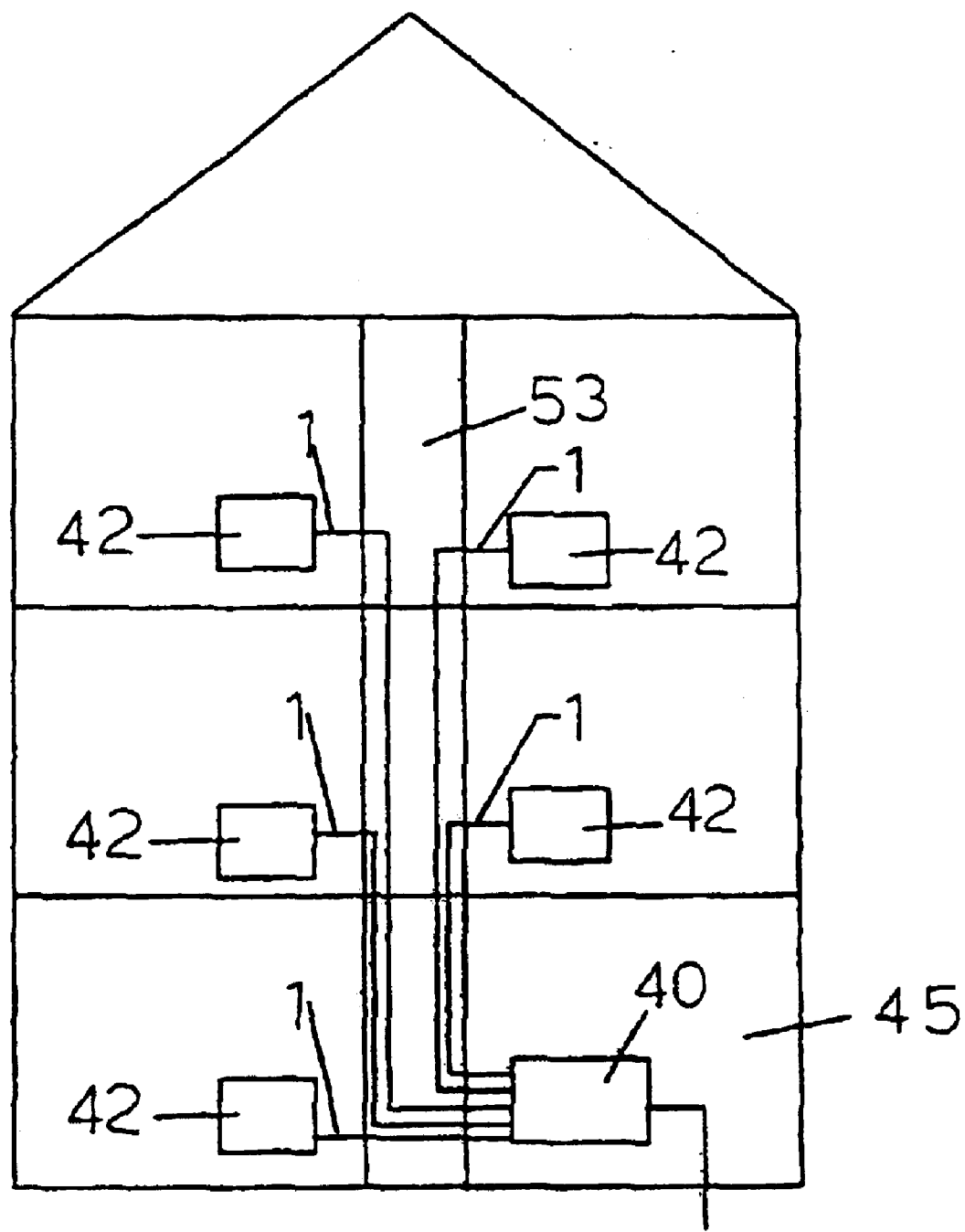
FIG. 9 shows a distribution network of the invention installed in a building with a raceway for the passage of electrically terminated optical cables.

FIG. 9 shows a distribution network 100 of the invention installed in a building. More in particular, the distribution unit 40 is arranged in a cellar or basement 45 of the building, and the electrically terminated optical cables 1—housed into a suitable raceway 53 of the building—connect the distribution unit 40 to the user apparatuses 42 located on the various floors of the building.

What is claimed is:

1. A network for distributing signals to a plurality of user apparatuses, comprising:
    a distribution unit having a plurality of ports;
    a plurality of optical-fibre cables connected to said ports and suitable to make said plurality of ports of said distribution unit communicate with said plurality of user apparatuses;
    at least one of said plurality of optical-fibre cables comprising an electrically terminated optical cable comprising an optical cable with an optical fibre and an opto-electronic end portion mechanically connected to an end of said optical cable,
    said opto-electronic end portion comprising an opto-electronic conversion device having an optic port optically aligned with and mechanically connected to, an end of said optical fibre wherein said optical fibre is single-mode and said opto-electronic end portion is permanently connected to said end of said optical cable.

2. A network according to claim 1, wherein said electrically terminated optical cable comprises a strength member.

3. A network according to claim 2, wherein said strength member comprises a plurality of longitudinal yarns, flexible and with tensile strength, arranged between an outer sheath of the electrically terminated optical cable and said single-mode optical fibre.

4. A network according to claim 3, wherein said longitudinal yarns are wound around and fastened to, the opto-electronic end portion.

5. A network according to claim 1, wherein said opto-electronic end portion further comprises an optical focusing lens having an elongated shape and a first endface optically aligned with and mechanically connected to, the optical port of said opto-electronic conversion device.

6. A network according to claim 1, wherein said opto-electronic end portion further comprises a ferrule firmly housing an end portion of said single-mode optical fibre so that said end of said optical fibre is lying flush with an endface of said ferrule.

7. A network according to claim 6, wherein said opto-electronic end portion further comprises an optical focusing lens having an elongated shape and a first endface optically aligned with and mechanically connected to, the optical port of said opto-electronic conversion device wherein said opto-electronic end portion also comprises a sleeve tightly housing said ferrule and said optical lens with said endface of said ferrule and a second endface of said optical lens facing each other so as to optically align said optical lens with said optical fibre housed into said ferrule.

8. A network according to claim 1, wherein said signals to be distributed are digital.

9. A network according to claim 1, wherein at least one of said plurality of ports of said distribution unit is an optical port.

10. A network according to claim 9, wherein an end of said single-mode optical fibre, opposed to the end optically aligned with and mechanically connected to the optical port of the opto-electronic conversion device, is connected by means of a fused junction with said optical port of said distribution unit, and said opto-electronic end portion has an electric port suitable to be connected to a corresponding user apparatus.

11. A network according to claim 1, wherein at least one of said plurality of ports of said distribution unit is an electric port.

12. A network according to claim 11, wherein said electrically terminated optical cable further comprises a second opto-electronic end portion, permanently connected to an end of said optical cable, opposed to that permanently connected to the first opto-electronic end portion, said second opto-electronic end portion comprising an opto-electronic conversion device having an optical port optically aligned with and mechanically connected to, an opposed end of said single-mode optical fibre, and an electric port suitable to be coupled to said electric port of said distribution unit.

13. A method for installing a network for distributing signals to a plurality of electric user apparatuses in a building, said network comprising a distribution unit having a plurality of optical ports and a plurality of electrically terminated optical cables, each comprising an optical cable with a single mode optical fibre and an opto-electronic end portion mechanically and permanently connected to an end of said optical cable, said method comprising, for each electrically terminated optical cable, the following steps:

a) inserting, from the side of the corresponding user apparatus, an optical end of the optical cable, opposed to that mechanically connected to the opto-electronic end portion, into a raceway of the building connecting the distribution unit to the user apparatus;

b) making the optical cable pass along said raceway, pulling it by the optical end of said optical cable inserted into the raceway during step a), until it arrives in the proximity of a corresponding optical port of the distribution unit;

c) optically connecting the optical end of the optical cable to the optical port of the distribution unit; and d) electrically connecting said end portion to the user apparatus.

14. A method according to claim 13, wherein step c) is carried out by means of a fused junction of an end of the single-mode optical fibre to the optical port of the distribution unit.

15. A method for installing a network for distributing signals to a plurality of electric user apparatuses in a building, said network comprising a distribution unit having a plurality of electric ports and a plurality of electrically terminated optical cables, each comprising an optical cable with a single-mode optical fibre and two opto-electronic end portions mechanically and permanently connected to two opposite ends of said optical cable, said method comprising, for each electrically terminated optical cable, the following steps:

a) inserting one of the two opto-electronic end portions into a raceway of the building connecting the distribution unit to the user apparatus;

b) making the optical cable pass along said raceway, pulling it by the opto-electronic end portion inserted into the raceway during step a);

c) electrically connecting one of the two opto-electronic end portions to the electronic port of the distribution unit; and d) electrically connecting the end portion, opposed to that of the step c), to the user apparatus.

* * * * *

UNITED STATES PATENT AND TRADEMARK OFFICE
CERTIFICATE OF CORRECTION

PATENT NO. : 6,909,821 B2
DATED : June 21, 2005
INVENTOR(S) : Giuseppe Ravasio et al.

It is certified that error appears in the above-identified patent and that said Letters Patent is hereby corrected as shown below:

Column 16,
Line 28, "yams" should read -- yarns, --.

Signed and Sealed this

Thirteenth Day of September, 2005

JON W. DUDAS
*Director of the United States Patent and Trademark Office*